(No Model.)
W. B. PAGE.
FASTENING DEVICE FOR GLOVES.
No. 591,261. Patented Oct. 5, 1897.
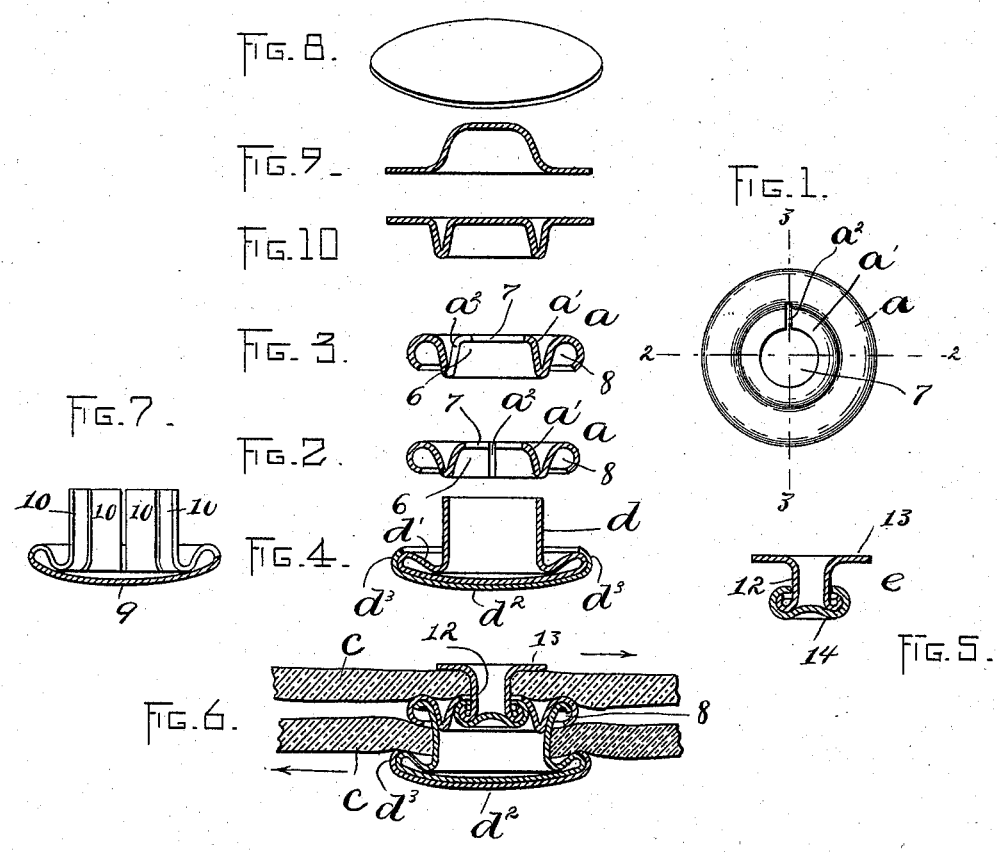
WITNESSES:
A. D. Harrison
P. W. Pezzette
INVENTOR:
Warren B. Page

UNITED STATES PATENT OFFICE.

WARREN B. PAGE, OF NEWTON, MASSACHUSETTS, ASSIGNOR OF ONE-THIRD TO WILLIAM B. DRAPER, OF MALDEN, MASSACHUSETTS.

FASTENING DEVICE FOR GLOVES.

SPECIFICATION forming part of Letters Patent No. 591,261, dated October 5, 1897.

Application filed March 11, 1897. Serial No. 626,942. (No model.)

*To all whom it may concern:*

Be it known that I, WARREN B. PAGE, of Newton, in the county of Middlesex and State of Massachusetts, have invented certain new and useful Improvements in Fastening Devices for Gloves, &c., of which the following is a specification.

This invention relates to that class of fastening devices used for connecting two parts or flaps of a glove or other like article, one member of the device being a socket and the other a stud adapted to engage the socket.

The invention has for its objects, first, to provide an improved construction of the socket member whereby its construction is simplified and rendered more compact and its holding power on the stud is increased, and, secondly, to provide an improved construction of stud member.

The invention consists in the improvements which I will now proceed to describe and claim.

Of the accompanying drawings, forming a part of this specification, Figure 1 represents a plan view of the socket member of my improved fastening device. Fig. 2 represents a section on line 2 2 of Fig. 1. Fig. 3 represents a section on line 3 3 of Fig. 1. Fig. 4 represents a sectional view of the anchoring device which secures the socket member to one of the flaps of a glove. Fig. 5 represents a sectional view of the stud member. Fig. 6 represents a sectional view showing the socket member united to one of the flaps of a glove and the stud member united to the other flap, said members being interlocked. Fig. 7 represents a sectional view of a modified form of anchoring device or eyelet. Figs. 8, 9, and 10 represent views showing different stages in the operation of making the socket member.

The same letters and numerals of reference indicate the same parts in all the figures.

My improved socket member comprises a sheet-metal annulus having a continuous outer or body portion $a$ and an inner portion or flange $a'$, which is made resilient by cutting one or more slots $a^2$, extending from its inner edges outwardly to the body $a$. The resilient flange $a'$ is formed so that its cross-section is inclined relatively to the plane of the annulus to form a cavity 6, which is larger than the opening 7, surrounded by the inner edge of the flange $a'$. The annular body $a$ is formed integral with the flange $a'$ and is rolled to form an annular cavity 8, the purpose of which will be hereinafter stated. The margin of the opening 7 constitutes a resilient throat adapted to yield to permit the head of a stud member to pass through it into the cavity 7 and to automatically contract around the neck of said stud member. Owing to the formation of the flange $a'$ upon the continuous or practically inexpansible body $a$ the resilience of the stud-grasping edge is determined by the depth or length of the slot $a^2$ and by the number of slots, if more than one be employed. I find in practice, however, that one slot is sufficient and is for most purposes preferable to a plurality of slots. Owing to the inclination of the cross-section of the flange $a'$ relatively to the plane of the annulus the edge of the opening 7 is engaged with the head of the stud member in such manner that strain exerted on the pieces or flaps $c$ $c$ in the direction indicated by the arrows in Fig. 6 will serve to increase the hold of the socket member on the stud member rather than to diminish said hold, the narrow edge of the opening 7 being wedged into the crevice between the head of the stud and the inner surface to which it is attached, pressure exerted as above described having no tendency to separate the two members.

The inner wall of annular socket 8, formed in the body $a$ of the socket member, is outwardly inclined to spread the outer end of a tubular anchoring device $d$, which may be formed as an eyelet having an open end adapted to enter the annular socket 8 and a suitable cap at its outer end. The opening or entrance to the annular socket faces in a direction opposite to that in which the flange $a'$ as a whole projects, so that the stud member enters the opening in the flange from the upper side, while the anchoring device extends below the piece or flap to which the completed device is secured. Said cap, as shown in Figs. 4 and 6, is formed by a flange $d'$, integral with the eyelet $d$, and a disk $d^2$, having a lip $d^3$, which is interlocked with the margin of the flange $d'$. In Fig. 7 I show the eyelet $d$ as composed of a series of tongues which are integral with the cap of the eyelet, the whole being made from a blank having a central uncut portion 9 and a series of tongues 10 radiating therefrom, said tongues being proportioned so that they may be bent inwardly and assembled to form a practically tubular eyelet. This construction enables the eyelet to be more readily spread in the annular socket 8 and reduces to the minimum the number of parts required.

$e$ represents the stud member, which is here shown as composed of a tubular post or shank 12, having a base-flange 13 and a cup-shaped cap or head 14, having a depressed central portion and a rolled edge formed to receive and spread the outer end of the shank 12, the stud member being formed by forcing the shank 12 into the head 14, so that the end of the shank will be turned outward by the inclined sides of the depression. Prior to the connection of the parts of the stud the shank 12 is inserted in an orifice in the flap $c$, to which the stud is to be attached, the flange 13 resting on one side of said flap. The head or cap 14 is then engaged with the end of the shank projecting from the opposite side of the flap, and thus the flap is confined between the head 14 and flange 13.

In Figs. 8, 9, and 10 I show a blank from which the socket member shown in Figs. 1, 2, and 3 may be made, said blank being a disk of sheet metal. (Shown in Fig. 8.) The central portion of the blank may be first offset, as shown in Fig. 9, to form the body of the flange $a'$, and the blank may then be subjected to an operation to give it the form shown in Fig. 10, thus forming the inner wall of the annular body $a$, after which the margin of the blank may be curled inwardly to complete the annular socket 8, the central portion of the blank being cut out and slotted by subsequent operations.

I claim—

1. In a fastening device of the character specified, a socket member comprising an annular sheet-metal body having an annular socket provided with an outwardly-inclined inner wall to receive and turn the end of an attaching-eyelet, said body also having a resilient inwardly-projecting flange integral with said body and extending in a direction opposite to the opening or entrance to the annular socket and formed to engage a stud member.

2. In a fastening device of the character specified, a member comprising, first, a sheet-metal annular body having an annular socket and a divided or slotted resilient inwardly-projecting flange integral with the body, and extending in a direction opposite to the opening or entrance to the annular socket and secondly, an eyelet having a head or cap at its outer end, its inner end being adapted to enter and be spread in said annular socket.

In testimony whereof I have signed my name to this specification, in the presence of two subscribing witnesses, this 27th day of February, A. D. 1897.

WARREN B. PAGE.

Witnesses:
C. F. BROWN,
A. D. HARRISON.